United States Patent
Baudesson et al.

(10) Patent No.: US 8,368,330 B2
(45) Date of Patent: Feb. 5, 2013

(54) ENERGY-RECOVERY DEVICE IN A VARIABLE SPEED DRIVE

(75) Inventors: Philippe Baudesson, La Boissiere (FR); Petar Grbovic, Pacy sur Eure (FR); Philippe Le Moigne, Nomain (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 183 days.

(21) Appl. No.: 12/991,546

(22) PCT Filed: Jun. 3, 2009

(86) PCT No.: PCT/EP2009/056836
§ 371 (c)(1), (2), (4) Date: Nov. 8, 2010

(87) PCT Pub. No.: WO2009/147186
PCT Pub. Date: Dec. 10, 2009

(65) Prior Publication Data
US 2011/0057587 A1 Mar. 10, 2011

(30) Foreign Application Priority Data
Jun. 6, 2008 (FR) ...................... 08 53773

(51) Int. Cl.
*H02P 3/14* (2006.01)
(52) U.S. Cl. ........ 318/376; 318/772; 318/296; 318/800; 318/400.3; 318/625; 187/290; 187/277; 187/296; 187/393; 180/65.1; 323/282; 307/75
(58) Field of Classification Search ............. 318/376, 318/772, 803, 296, 331, 345, 800, 801, 802, 318/400.3, 441, 440, 625; 187/290, 277, 187/296, 393; 363/131; 323/282; 307/75; 180/65.1
See application file for complete search history.

(56) References Cited

U.S. PATENT DOCUMENTS 6,919,711 B2 * 7/2005 Haydock et al. ............... 322/24
7,106,023 B2 * 9/2006 Ota et al. ....................... 318/803
(Continued)

FOREIGN PATENT DOCUMENTS
EP 1 641 110 3/2006

OTHER PUBLICATIONS

International Search Report issued Nov. 9, 2009 in PCT/EP09/056836 filed Jun. 3, 2009. U.S. Appl. No. 13/062,716, filed Mar. 8, 2011, Grbovic, et al.

*Primary Examiner* — Walter Benson
*Assistant Examiner* — Jorge Carrasquillo
(74) *Attorney, Agent, or Firm* — Oblon, Spivak, McClelland, Maier & Neustadt, L.L.P.

(57) ABSTRACT

The invention relates to a variable speed drive comprising a direct-current power bus having a positive line (16) and a negative line (17), and an inverter module (14) supplied by the direct-current bus in order to supply a variable voltage to an electric load (M). The drive comprises an energy-recovery device (10) comprising a first direct-current/direct-current converter (20), the output stage of the first converter (20) being connected in series to the positive line of the direct-current bus, a second direct-current/direct-current converter (30), the input stage of the second converter (30) being connected between the positive line and the negative line of the direct-current bus, and an electric energy storage module (Cs) connected in parallel with the input stage of the first converter (20) and with the output stage of the second converter (30).

7 Claims, 3 Drawing Sheets

Figure 1:
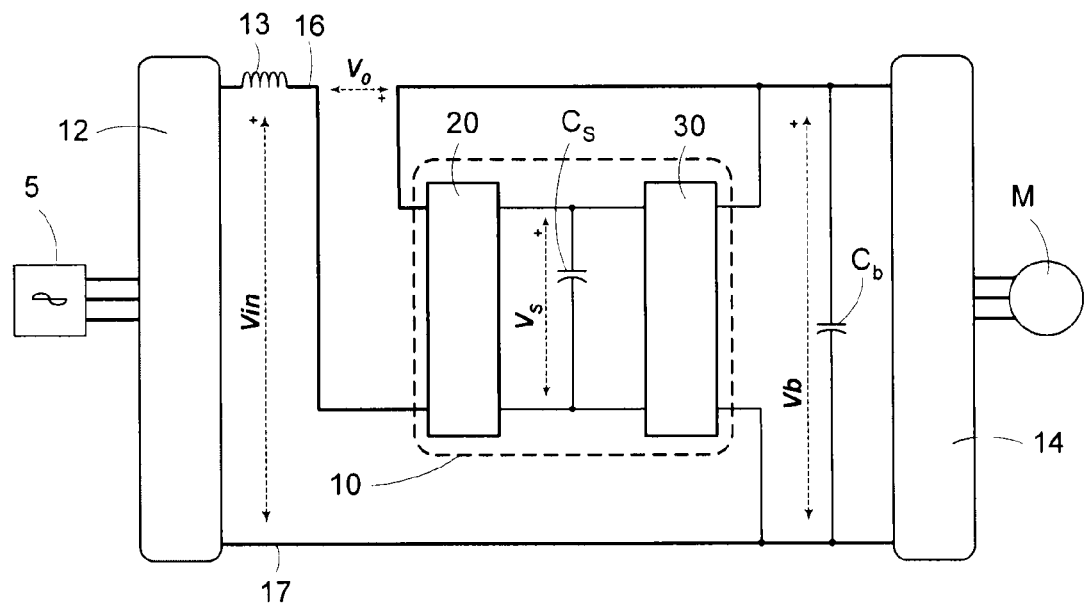

U.S. PATENT DOCUMENTS 7,984,776 B2 *  7/2011  Sastry et al. ................. 180/65.1
2001/0017234 A1  8/2001  Suga et al.
2006/0066283 A1  3/2006  Ota et al.
2006/0152085 A1 *  7/2006  Flett et al. ....................... 307/75
2006/0267527 A1  11/2006  Khopkar et al.
2007/0275276 A1 *  11/2007  Saeki et al. ..................... 429/13

* cited by examiner

ENERGY-RECOVERY DEVICE IN A VARIABLE SPEED DRIVE

The present invention relates to a variable speed drive comprising an energy-recovery device incorporating a module for storing the recovered energy. Such a speed drive is used in particular to control an electric motor in applications having frequent accelerations and decelerations such as lifting applications or position-adjustment applications.

An energy recovery device is usually used to be able to store the energy when the motor is in braking mode (or recovery mode), then to restore the energy thus stored when the motor is in driving mode (or motor mode), and if necessary to supply standby energy in the event of the disappearance of the mains supply of the drive.

Prior-art documents such as US2001017234, EP1641110, U.S. Pat. Nos. 6,742,630, 6,938,733, WO2006/016002 or EP1586527A1 already propose energy-recovery solutions associated with a variable speed drive. The existing topologies are usually based on an additional power converter and an energy-storage module, in which the power converter is connected in parallel to the direct-current power bus of the variable speed drive. The energy-storage module often comprises one or more "supercapacitors" or a combination of a "supercapacitor" and a battery.

The "supercapacitor" or "ultracapacitor" term designates a known component which is capable of storing a greater quantity of electric energy than a conventional capacitor, close, for example, to an electro-chemical battery, but also capable of accepting considerable charging and discharging currents like a conventional capacitor, unlike an electro-chemical battery.

The existing solutions do not make it possible to amplify (or boost) the voltage of the direct-current bus to a value greater than the voltage supplied at the output of a rectifier by the mains supply of the drive. Similarly, the direct-current bus voltage cannot be adjusted to reduce the oscillations of the direct-current bus so as to reduce the distortion rate of the driving currents and therefore the torque ripple when the voltage applied to the output of the inverter is maximal. In addition, the current absorbed by the rectifier cannot have a rate of total harmonic distortion of current (THDI) below 30%. Furthermore, the load factor of the switches used in the energy-recovery device is not optimized.

The object of the invention is therefore to propose a variable speed drive comprising an energy-recovery device in order to save energy, improve the performance of the drive and not have the above disadvantages. In particular, the energy-recovery device must notably make it possible to:

Recover and store electric energy when the variable speed drive operates in braking mode.

Restore to the drive the electric energy stored in braking mode.

Reduce to approximately 30% the rate of total harmonic distortion of current (THDI) of the phases of the mains supply at the drive input.

Remove the variations of this direct-current bus voltage (ripple-free function) at the mains frequency (approximately 50 Hz), despite the possible disturbance of the external mains supply, even in the case of a drive having no bus capacitor (C-less topology). A voltage regulation of the direct-current bus makes it possible in particular to have better control of the torque and the flux of the motor.

Increase if necessary the direct-current bus voltage supplied by the rectifier module of the drive (boost function), which makes it possible to have an energy reserve.

For this, the invention describes a variable speed drive comprising a direct-current power supply bus fitted with a positive line and a negative line, and an inverter module supplied by the direct-current bus in order to supply a variable voltage to an electric load. The drive comprises an energy-recovery device, which comprises a first direct-current/direct-current converter comprising an input stage and an output stage, the output stage of the first converter being connected in series to the positive line of the direct-current bus, a second direct-current/direct-current converter comprising an input stage and an output stage, the input stage of the second converter being connected between the positive line and the negative line of the direct-current bus, and an electric energy storage module which is connected in parallel with the input stage of the first converter and in parallel with the output stage of the second converter.

According to one feature, the electric energy storage module comprises one or more supercapacitors.

According to another feature, the first direct-current/direct-current converter is an uninsulated one-way converter which comprises an active switch and a passive switch.

In the present document, "active switch" makes reference to a switch the switching of which is controlled to open and/or to close, such as a transistor, a thyristor or a triac. Conversely, a "passive switch" makes reference to a switch which has spontaneous switching, such as a diode.

According to another feature, the passive switch is a diode which is connected in series to the positive line of the direct-current bus, the output stage of the first converter being connected to the terminals of the diode, and the input stage of the first converter being connected to the terminals of the assembly formed by the active switch and the passive switch connected in series. The active switch is a power transistor which is controlled by a first control signal generated by the variable speed drive.

According to another feature, the second direct-current/direct-current converter is an uninsulated two-way converter which comprises a first active switch connected in series to a second active switch. The output stage of the second converter is connected to the terminals of the second active switch, and the input stage of the second converter is connected to the terminals of the assembly formed by the first active switch and the second active switch.

According to another feature, the second direct-current/direct-current converter is an insulated two-way converter comprising a high-frequency transformer.

Figure 2:
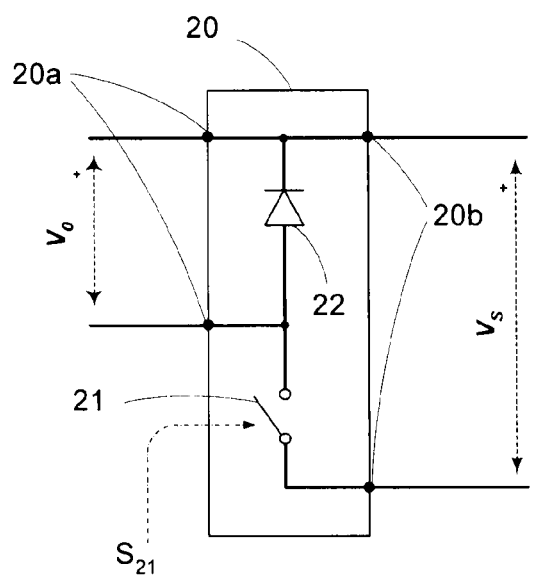
Figure 3:
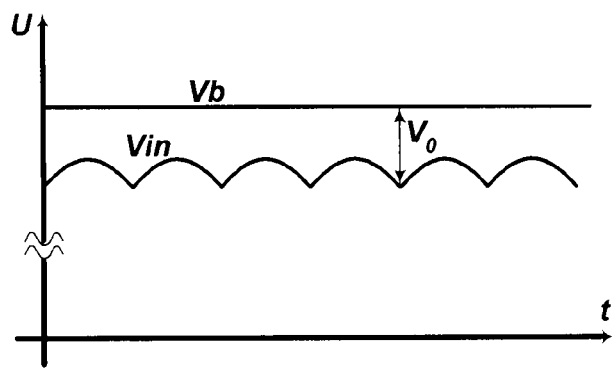
Figure 4:
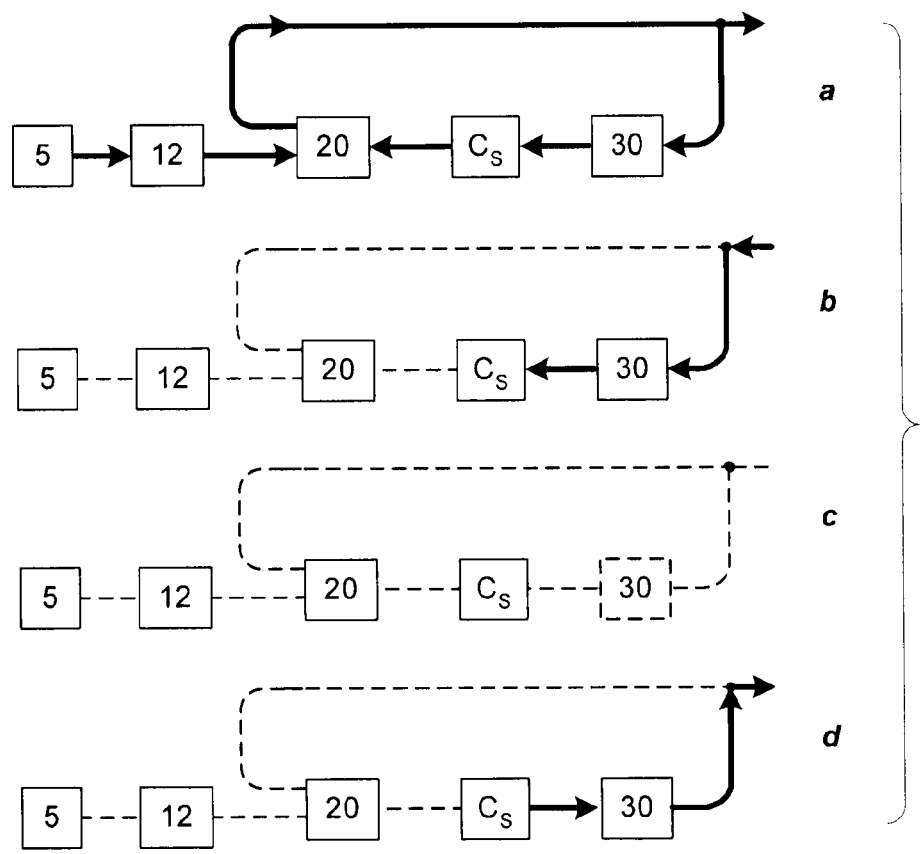
Figure 5:
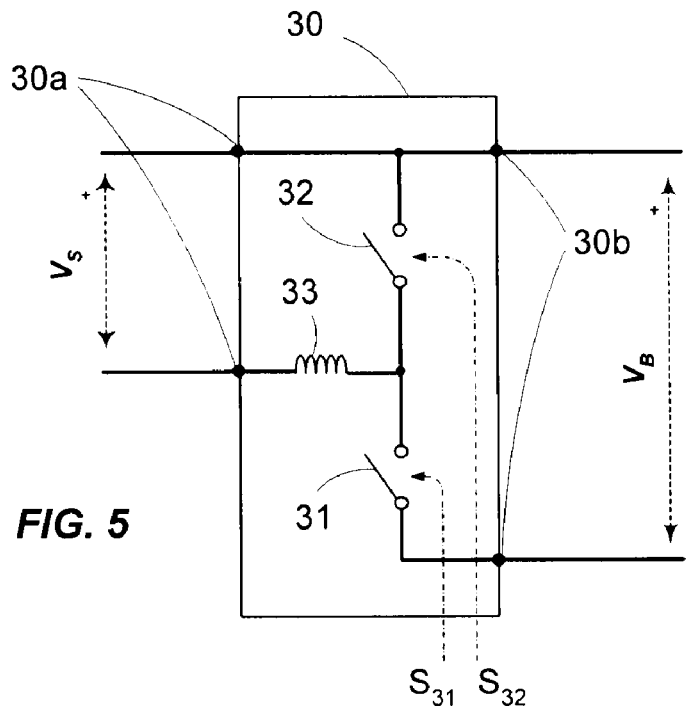
Figure 6:
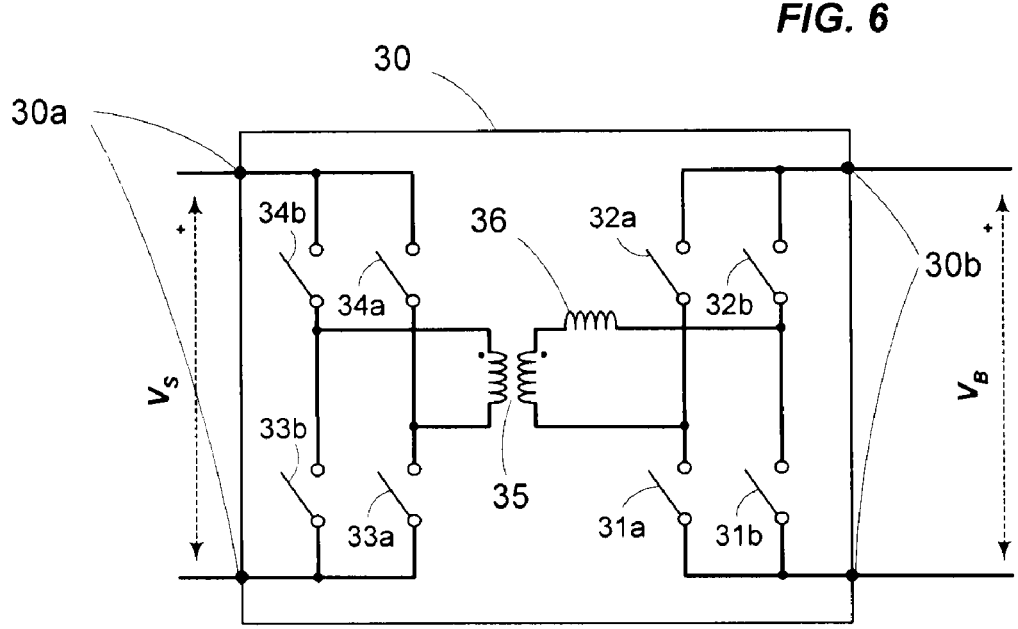

Other features and advantages will appear in the following detailed description making reference to an embodiment given as an example and represented by the appended drawings in which:

FIG. 1 shows a simplified example of the architecture of a drive according to the invention, FIG. 2 gives details of a preferred embodiment of the first direct-current/direct-current converter, FIG. 3 represents a diagram of the direct-current bus voltage and of the rectified voltage, FIGS. 4a to 4d illustrate the various operating modes of the drive, FIGS. 5 and 6 give details of several embodiments of the second direct-current/direct-current converter.

With reference to FIG. 1, a variable speed drive, of the frequency converter type, is supplied by a three-phase external mains supply 5. The drive comprises a rectifier module 12 delivering a rectified voltage $V_{IN}$ between a positive line 16 and a negative line 17 of a direct-current power supply bus.

Preferably, the rectifier module 12 uses diodes and does not require thyristors. Preferably, an additional filter inductance 13 of low value is placed in series on the positive line 16 of the direct-current bus.

The drive then comprises an inverter module 14 supplied by the direct-current bus and delivering a variable voltage to an external electric load M, in particular a synchronous or an asynchronous electric motor. Such an inverter module 14 usually comprises power transistors that are controlled by control signals originating from a control unit of the variable speed drive (not shown in the figures). The drive may also comprise a bus capacitor $C_B$ connected between the positive line 16 and the negative line 17 of the direct-current bus, on the side of the inverter module 14. The direct-current voltage at the terminals of this bus capacitor $C_B$ is called the bus voltage $V_B$.

The drive comprises an energy-recovery device 10 designed to recover and store electric energy when the electric load M becomes driving (motor braking). According to the invention, the energy-recovery device 10 comprises a first direct-current/direct-current converter (or DC/DC converter) 20, a second direct-current/direct-current converter (or DC/DC converter) 30 and an electric energy storage module $C_S$. The first direct-current/direct-current converter 20 comprises an input stage 20b formed by two input terminals and an output stage 20a formed by two output terminals. Similarly, the second direct-current/direct-current converter 30 comprises an input stage 30b formed by two input terminals and an output stage 30a formed by two output terminals.

The output stage 20a of the first converter 20 is connected in series to the positive line 16 of the direct-current bus, between the filter inductance 13 and the bus capacitor $C_B$. There is a voltage $V_0$ between the two terminals of this output stage 20a, such that: $V_B=V_{IN}+V_0$, not taking account of the voltage at the terminals of the inductance 13. The input stage 30b of the second converter 30 is connected between the positive line 16 and the negative line 17 of the direct-current bus, upstream of the bus capacitor $C_B$, that is to say between the rectifier module 12 and the bus capacitor $C_B$.

The storage module $C_S$ is connected in parallel with the input stage 20b of the first converter 20 and in parallel with the output stage 30a of the second converter 30. The voltage at the terminals of the storage module $C_S$, that is to say at the terminals of the output stage 30a and at the terminals of the input stage 20b, is called V. Preferably, the storage module $C_S$ consists of one or more supercapacitors, so as to allow the storage of a large quantity of electric energy and to allow high charging/discharging currents.

The first converter 20 is a one-way direct-current/direct-current converter which is not insulated. It receives at the input the voltage $V_S$ of the storage module $C_S$ and delivers at the output the voltage $V_0$ on the positive line 16 of the direct-current bus. A very simple embodiment of the first converter 20 is shown in detail in FIG. 2. It simply comprises a passive switch 22 in series with an active switch 21. In a preferred manner, the active switch is a power transistor 21 of the IGBT, MOSFET or other type, and the passive switch is a diode 22 the anode of which is placed on the side of the active switch 21. The power transistor 21 is controlled by a control signal $S_{21}$ originating from the control unit of the variable speed drive. The control signal $S_{21}$ is a pulse width modulation (PWM) signal which in particular makes it possible to vary the output voltage $V_0$ of the first converter 20.

The output stage 20b of the first converter 20 is directly connected to the terminals of the diode 22, and the input stage 20a of the first converter 20 is directly connected to the terminals of the assembly formed by the power transistor 21 and the diode 22 connected in series. The diode 22 is therefore placed in series on the positive line 16 of the direct-current bus and the voltage $V_D$ at the terminals of the diode is equal to the output voltage $V_0$ of the first converter 20.

When the power transistor 21 is open (OFF state), then the current of the direct-current bus flows in the diode 22. The voltage $V_D$ at the terminals of the diode is therefore zero, so $V_0=0$ and $V_B=V_{IN}$. When the power transistor 21 is closed (ON state), the current flows in the transistor 21 and the voltage $V_D$ then becomes equal to the voltage $V_S$ of the storage module $C_S$, so $V_B=V_{IN}+V_S$. The output voltage $V_0$ therefore varies between 0 and $V_S$ and is always positive or zero. Therefore, by acting on the control signal $S_{21}$ of the power transistor 21, it is possible to adjust the voltage $V_B$ and the current flowing in the inductance 13.

The second converter 30 is a two-way direct-current/direct-current converter. It receives at the input the voltage $V_B$ of the direct-current bus and delivers at the output the voltage $V_S$ of the storage module $C_S$. The input stage 30b of the second converter 30 is therefore directly connected to the bus capacitor $C_B$ and the output stage 30a of the second converter 30 is directly connected to the storage module $C_S$.

In a general manner, the second converter 30 may be a two-way current direct-current/direct-current converter and may be insulated or uninsulated. The uninsulated topologies are of the half-bridge type with two levels or with several levels of voltage—for example of the NPC (Neutral Point Capacitor) or Flying capacitor type. The insulated topologies are of the all-silicon soft-switching type comprising an HF transformer surrounded by two direct-current/direct-current converters of the half-bridge or full-bridge type.

Several simple embodiments of the second converter 30 are shown in detail in FIGS. 5 and 6.

FIG. 5 shows a very simple embodiment of a second converter 30 in uninsulated topology. It comprises a first active switch 31 in series with a second active switch 32. Preferably, these active switches are two-way current switches such as power transistors of the IGBT, MOSFET or JFET type, each having a free-wheel diode in parallel. The power transistors 31, respectively 32, are controlled by control signals $S_{31}$, respectively $S_{32}$, originating from the variable speed drive control unit. The control signals $S_{31}$, $S_{32}$ are pulse width modulation (PWM) signals.

The output stage 30a of the second converter 30 is connected to the terminals of the second power transistor 32, and the input stage 30b is connected to the terminals of the assembly formed by the first power transistor 31 and the second power transistor 32 connected in series. The second converter 30 also comprises a line inductance 33 connected between the mid-point of the two power transistors 31, 32 and the negative terminal of the storage module $C_S$. The inductance 33 makes it possible to limit the current variation of the storage module $C_S$ during the charging or the discharging of the storage module $C_S$.

This simplified embodiment of the second converter 30 has the advantage of being very economical and of using very few components, but has the disadvantage of a direct connection between the storage module $C_S$ and the direct-current bus, which may cause considerable stress on the power transistors 31, 32: high voltage determined by the bus voltage $V_B$ and high current determined by the current of the storage module $C_S$.

FIG. 6 shows an exemplary embodiment of a second converter 30 in insulated topology which comprises a high-frequency transformer 35 with two windings allowing a galvanic insulation while permitting the transfer of energy. On each side of the transformer 35, the second converter 30 comprises four active switches mounted in series two-by-two, marked 31a,31b,32a,32b on the side of the bus capacitor $C_B$ and 33a,33b,34a,34b on the side of the storage module $C_S$. All these active switches are two-way current switches, such as power transistors of the IGBT, MOSFET type, each furnished with a free-wheel diode and having a snubber capacitor in parallel (not shown). The control signals of these eight switches are phase shift modulation signals originating from the variable speed drive control unit. The windings of the transformer 35 are connected between the mid-points of the active switches, as shown in FIG. 6. In addition, a leakage inductance 36 is connected on the side of the bus capacitor $C_B$ between a winding of the transformer 35 and a mid-point of two switches 31b,32b. This inductance 36 in particular allows switching of the switches to a zero voltage (soft switching).

In a variant of the embodiment of FIG. 6, it is possible to replace the switches 31b,32b,33b,34b with capacitors. The second converter 30 then comprises four capacitors and only four active switches. In this case, these four active switches require no snubber capacitor and their control signal is a frequency modulation signal. This variant has the advantage of being more economical.

The various cases of operation of the energy-recovery device 10 are illustrated in FIGS. 4a to 4d:

The normal operating mode (FIG. 4a—a driving mode) corresponds to a mode in which the drive is supplied by the external mains 5, via the rectifier 12, and uses the energy supplied by the mains 5 in order to supply and drive the load M. The bus voltage $V_B$ is kept constant and higher than the rectified voltage $V_{IN}$ by virtue of the provision of the voltage $V_0$ at the output from the first converter 20. As indicated in FIG. 3, the voltage $V_0$ therefore has the role of increasing the rectified voltage $V_{IN}$ of the rectifier module 12 (boost function) and of cancelling out the ripples of the rectified voltage $V_{IN}$ (ripple-free function). Another important function of the first converter 20 is to keep practically constant the current flowing in the inductance 13, despite possible variations in the voltage of the external mains supply 5. During this mode, the energy supplied by the mains 5 also allows the second converter 30 to charge the supercapacitor $C_S$ and/or to keep the voltage $V_S$ at the terminals of the supercapacitor $C_S$ at a minimal value $V_{Smin}$.

FIG. 4b corresponds to the braking mode, in which the drive recovers and stores the electric energy supplied by the load M when the latter is driving (like a lift motor in the descent phase). This recovered braking energy makes it possible to charge the supercapacitor $C_S$. The second converter 30 has the role of adjusting the bus voltage $V_B$ and of increasing the voltage $V_S$ at the terminals of the supercapcitor $C_S$. In this mode, the control signal $S_{21}$ keeps the active switch 21 in the open state.

FIG. 4c corresponds to a mode in which no energy is consumed or recovered by the load M (standby mode).

FIG. 4d corresponds to the restore mode, in which the energy stored by the supercapacitor $C_S$ during the braking mode is restored to the drive by virtue of the second converter 30. In this mode, the energy stored in the supercapacitor $C_S$ is returned to the load M and the voltage $V_S$ therefore reduces until it reaches the minimal value $V_{Smin}$. In this mode, the control signal $S_{21}$ keeps the active switch 21 in the open state. When the voltage $V_S$ reaches the minimal value $V_{Smin}$, the load M must again be supplied from the external mains 5 and the drive therefore returns to the normal operating mode 4a.

Moreover, the architecture proposed by the invention also makes it possible to guard against short interruptions of the external mains 5, by allowing, in this case, a greater discharge of the supercapacitor $C_S$ so as to be able to maintain the supply of the load M.

It is well understood that it is possible, without departing from the context of the invention, to imagine other variants and detail enhancements and similarly to envisage the use of equivalent means.

The invention claimed is:

1. Variable speed drive comprising a direct-current power supply bus having a positive line and a negative line, an inverter module supplied by the direct-current bus in order to supply a variable voltage to an electric load, and an energy-recovery device, wherein in that the energy-recovery device comprises:
    a first direct-current/direct-current converter comprising an input stage and an output stage, the output stage of the first converter being connected in series to the positive line of the direct-current bus,
    a second direct-current/direct-current converter comprising an input stage and an output stage, the input stage of the second converter being connected between the positive line and the negative line of the direct-current bus,
    an electric energy storage module which is connected in parallel with the input stage of the first converter and in parallel with the output stage of the second converter,
    wherein in that the first direct-current/direct-current converter is an uninsulated one-way converter which comprises an active switch and a passive switch; and
    wherein in that the second direct-current/direct-current converter is an uninsulated two-way converter which comprises a first active switch connected in series to a second active switch or an insulated two-way converter comprising a high-frequency transformer.

2. Variable speed drive according to claim 1, wherein in that the electric energy storage module comprises one or more supercapacitors.

3. Variable speed drive according claim 1, wherein in that the passive switch of the first converter is a diode which is connected in series to the positive line of the direct-current bus, the output stage of the first converter being connected to the terminals of the diode, and the input stage of the first converter being connected to the terminals of the assembly formed by the active switch and the passive switch connected in series.

4. Variable speed drive according to claim 3, wherein in that the active switch of the first converter is a power transistor of the MOSFET or IGBT type, which is controlled by a first control signal generated by the variable speed drive.

5. Variable speed drive according to claim 1, wherein in that the second direct-current/direct-current converter is an uninsulated two-way converter which comprises a first active switch connected in series to a second active switch.

6. Variable speed drive according to claim 5, wherein in that the output stage of the second converter is connected to the terminals of the second active switch, and the input stage of the second converter is connected to the terminals of the assembly formed by the first active switch and the second active switch.

7. Variable speed drive according to claim 1, wherein in that the second direct-current/direct-current converter is an insulated two-way converter comprising a high-frequency transformer.

* * * * *